April 29, 1958     R. L. BRUNSING ET AL     2,832,690
METHOD OF COOLING AND PRESERVING
LETTUCE AND LEAFY VEGETABLES
Filed Aug. 8, 1955     2 Sheets-Sheet 1
FIG_1
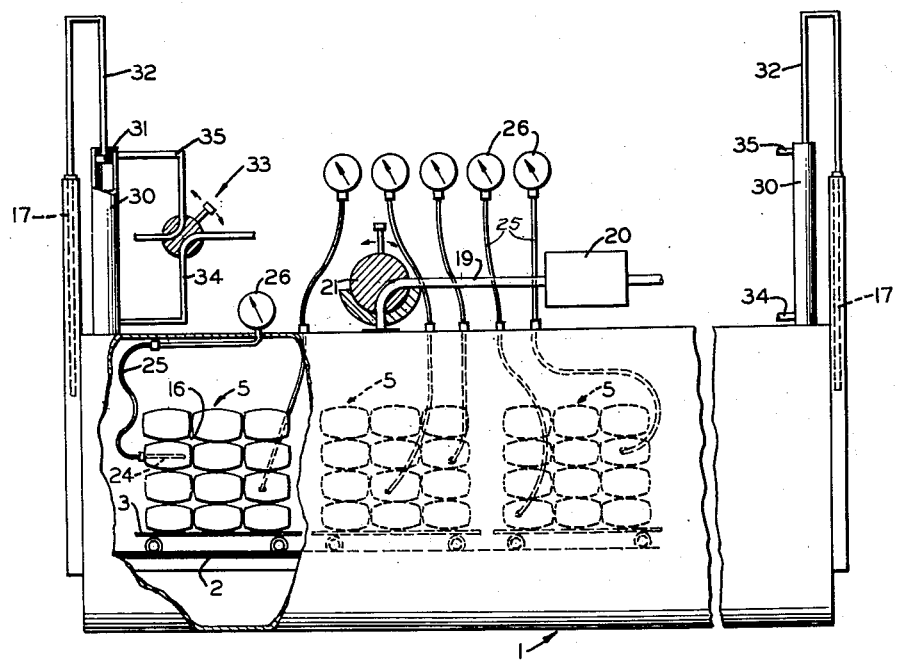
FIG_2
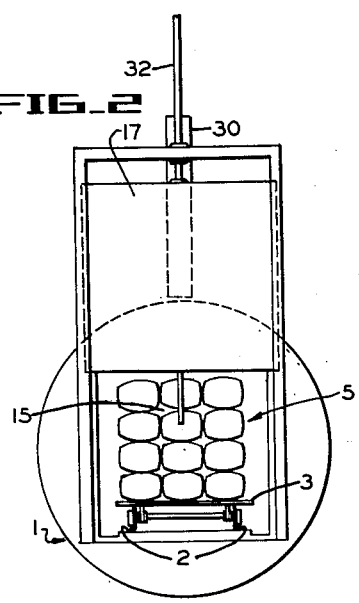
FIG_3
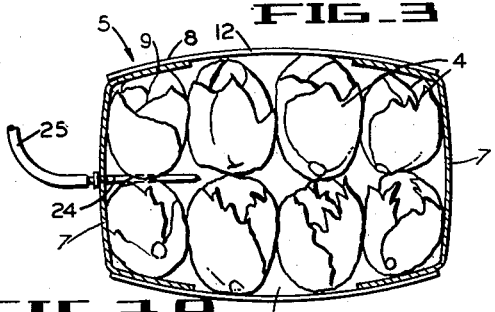
FIG_3A
INVENTOR.
REX L. BRUNSING
BY WELLS A. WEBB
ATTORNEYS April 29, 1958  R. L. BRUNSING ET AL  2,832,690
METHOD OF COOLING AND PRESERVING
LETTUCE AND LEAFY VEGETABLES
Filed Aug. 8, 1955  2 Sheets-Sheet 2
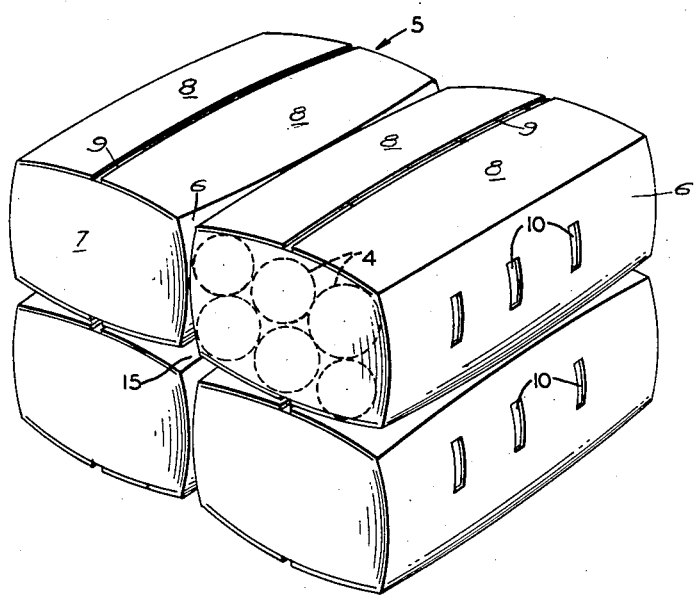
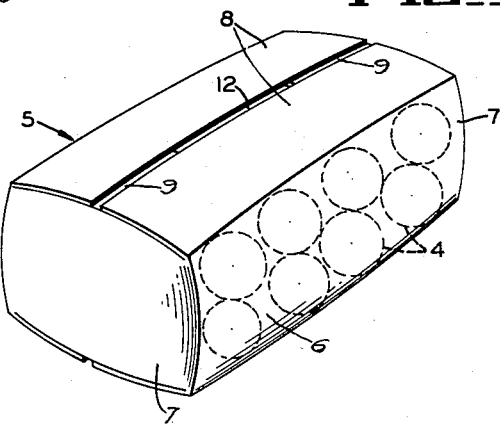
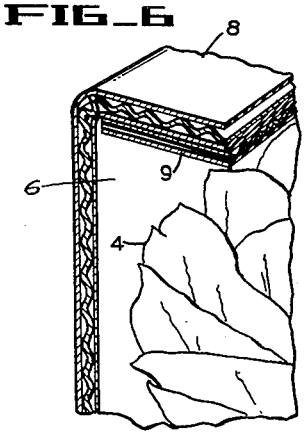
INVENTOR.
REX L. BRUNSING
BY WELLS A. WEBB
ATTORNEYS

2,832,690

METHOD OF COOLING AND PRESERVING LETTUCE AND LEAFY VEGETABLES

Rex Louis Brunsing and Wells A. Webb, San Francisco, Calif., assignors, by mesne assignments, to Western Vegetable Industries, Inc., Salinas, Calif., a corporation of California Application August 8, 1955, Serial No. 527,015

3 Claims. (Cl. 99—193)

This invention relates generally to the precooling of such fruit and vegetable products as are of a character that have adequate vaporizable surface moisture to enable the products to be cooled to, say, about 32° F. by the evaporation of such moisture by the method similar to that disclosed in United States Letters Patents No. 2,699,048, issued January 11, 1955, and No. 2,684,907, issued July 30, 1954, to Rex L. Brunsing.

Favorable conditions for vacuum cooling are met in all varieties of lettuce, spinach, cabbage, green ear corn, Brussels sprouts, endive, celery and like leafy vegetables. Also some porous fruits such as strawberries, where the ratio of surface area to weight is high and the surfaces are supplied by nature with a multiplicity of stoma or microscopic openings through which transpiration occurs.

One of the objects of this invention is the provision of precooling such products as are above described, or such as have adequate vaporizable surface moisture to enable the products to be safely and quickly cooled to the desired degree, and of accomplishing this precooling while the products are packed in fiberboard cartons that are substantially closed against the free circulation of air therethrough by convection. Each of such cartons has a sufficient opening or openings to insure a rapid evacuation of air and the vapors of evaporation therefrom and the cooling of the products within the cartons not only effects a cooling of the interior of the carton and the walls thereof, but removes the moisture absorbed by the carton walls from the humid air within the carton (before exhaustion of such humid air) thereby causing the walls to be strengthened against collapse.

Cardboard cartons have heretofore been successfully used, as shown in the above mentioned Patent No. 2,684,907, for shipping lettuce and leafy vegetables, prior to which time the packing of lettuce and fresh fruits and fresh vegetables in fiberboard cartons was considered an impossibility. The reasons for this were that the use of ice in connection with the cooling of such products would quickly cause disintegration of the carton walls. Another reason was the fact that lettuce etc., packed in fiberboard cartons that would be capable of being vacuum cooled, contains a substantial amount of free moisture, and by conventional cooling methods in which cooling was attempted by blowing cold air over the cartons or by merely placing the filled cartons under refrigeration there would be little effect on the contents since the carton walls were good heat insulators and the openings in the carton walls, if made large enough to admit sufficient cold air or to enable cooling by convection, would so weaken the cartons as to be of no value. Also, the vapors of evaporation of the free moisture from the contents would be quickly absorbed by the carton walls so that they would quickly weaken to the point where they had little strength, and in some instances the carton walls would become so damp as to become moldy.

The superior advantages of fiberboard cartons over crates, from the standpoint of heat insulation, whether or not the latter were lined with paper, has been recognized. The method as disclosed in said Patent No. 2,684,907 has been highly satisfactory, as is the apparatus as disclosed in said U. S. Patent No. 2,699,048. However, the improvements hereinafter disclosed are of substantial and material benefit. In the last mentioned patent the crated lettuce (not in fiberboard container) was left within a partially evacuated tank for a predetermined time without removing the moisture of evaporation, hence such moisture would, to some extent, become absorbed in the walls of cartons (when cartons were employed). As already explained, it is very desirable, if not essential, that the walls of the fiberboard cartons remain as dry as possible for the reason that they rapidly weaken as they absorb moisture. For example, a fiberboard carton having a moisture content of, say, only 7% will have only a half inch deflection under a compressive force of 1,000 lbs., but the same wall containing 24% moisture, which is not unusual in cartons containing fresh fruit and vegetables, will have the same one half inch deflection under a compressive force of only 200 lbs. It might be added that this degree of moisture is not uncommon in fruit and vegetable products that are not ordinarily considered as having much free vaporizable moisture.

Another object of the invention is the provision of a method of safely cooling and of preparing lettuce etc. for shipment in which the lettuce, and only such free vaporizable moisture as is carried on the surface thereof, is packed within cartons, and the temperature of the lettuce and interior of the cartons is reduced solely by the evaporation of said free moisture to the point where the lettuce heads and leaves (or other vegetables mentioned) are above their freezing point and at a temperature above the freezing point of the free moisture that is on them. The leaves of lettuce may, under the above circumstance, be below 32° F. and the free moisture may be below 32° F. without freezing, if said water contains natural vegetable salts sufficient to lower the freezing point of the water, but preferably, the evaporation of moisture ceases when a temperature of such moisture is reached slightly above the temperature at which it will freeze if evaporation is continued, to insure against ice forming on the leaves.

Another object of the invention is the provision of a method of cooling that is particularly suited for fruit and vegetable products in fiberboard cartons that are substantially closed against free circulation of outside air, by convection, through the cartons and their contents, whereby the interiors of the cartons and the contents thereof will remain cool or below the critical temperature of about 40° F. after having been cooled to substantially 32° F. for a substantially greater length of time than lettuce in open or lined crates.

A still further object of the invention is the provision of a method for safely equalizing the temperature within the heads of lettuce, where the heart or inside leaves may carry the vaporizable moisture and the outside leaves are relatively dry, or where the reverse situation occurs.

Lettuce may be harvested after a rain or fall of dew, and no irrigation, in which case the outside leaves will carry vaporizable moisture but the interior leaves near the heart or center of the head will be relatively dry. Under such circumstances the outside leaves may reach a temperature of 32° F. while said inside leaves are at 40° F. or even higher. Under such a condition removal of the lettuce from the vacuum tank will result in an equalizing of the temperature within the head at a temperature substantially above 32° F.

At times, after a dry wind and irrigation (which is not unusual), the outside leaves of a head of lettuce may be dry and limp while the vaporizable moisture is on the inside leaves. Under this circumstance the inside leaves may quickly cool to 32° F. while the outside leaves are at about 40° F., and if the vacuum ceases at this point, the temperature in the heads will become equalized at a temperature substantially above 32° F., or around 35° F.

By the present method the temperature within the heads is equalized at approximately 32° F. with complete safety from freezing the lettuce, which is quite important since lettuce that is frozen is not marketable.

Other objects and advantages will appear in the description and in the drawings.

In the drawings,

Fig. 1 is a semi-diagrammatic side view of a vacuum tube or drum into which the packed cartons are positioned, with several cars of filled cartons in the tube.

Fig. 2 is an end view of the tube of Fig. 1 with the gate open.

Fig. 3 is an enlarged sectional view taken through a carton of lettuce showing the thermometer in position in contact with the leaves of lettuce that is within the carton.

Fig. 3-A is a fragmentary, sectional view showing a thermometer inserted in a head of lettuce.

Fig. 4 is a perspective view of several pairs of adjacent cartons, said cartons illustrating structure and arrangement of the cartons relative to each other to facilitate carrying out the present method.

Fig. 5 is an enlarged perspective view of a slightly different carton than is shown in Fig. 3.

Fig. 6 is an enlarged fragmentary sectional view taken through a side and top of a carton as shown in Fig. 5 along an upper corner, a head of lettuce being indicated in full line.

In detail, the apparatus semi-diagrammatically illustrated in Fig. 1 comprises a stationary, cylindrical, horizontally disposed tube or drum 1 that has a track 2 therein extending longitudinally thereof for supporting the wheels of trucks or carts 3 within the tube for movement of such trucks into and through the tube longitudinally thereof.

According to the preferred form of the present invention, the heads 4 of lettuce (Fig. 3) are packed in the field, at the field heat of the lettuce, into fiberboard cartons 5. These cartons may be of substantially the conventional type having side walls 6, end walls 7, top closure flaps 8 and 9 that fold over each other in pairs and at right angles to each other. The top and bottom flaps may substantially seal the cartons top and bottom as in Fig. 4, in which case the side walls are preferably formed with slots 10 (Fig. 4), the total area of which may be from about 2 square inches to about 4 square inches where the contents is lettuce and where weight of lettuce in each carton is from, say, about 25 to 50 pounds, and this is approximately the weight of lettuce in cartons of about 22 x 14 x 10 inches holding from about 24 to 30 heads of lettuce. Three slots 10 on the opposite sides of each carton have been found to be adequate and variations can exist provided the openings are not so many nor so large as to enable substantially free circulation of outside air therethrough, as exists in the case of wooden crates.

Cartons such as shown in Figs. 3, 5 are more conventional, in which a slot 12 (the same in the bottom) is provided between the edges of the flaps 8, 9. Here again the opening is relatively small, and when the interior of the carton and the lettuce is at about 32° F., hours will elapse when the carton is subjected to the atmosphere at atmospheric temperature before the temperature of the contents will rise to 40° F. Above 40° F. deterioration in the case of lettuce is relatively rapid, while below 40° F. it is negligible. Usually a crate or case of lettuce, in normal handling between the time the contents are precooled to 32° F. and the time the crate or case reaches the retailer, will be exposed to atmosphere at atmospheric temperature (of around 60° to 85° F. in the summer) for from one to four or five hours, and this time in most instances approaches the latter. Where free circulation of outside air through the crates by convection is not permitted and the walls of the container of conventional double faced corrugated fiberboard, the lettuce will be at or below 40° F. when it reaches the retailer; whereas in crates, whether lined with paper or not, it will be at a temperature well above 40° F. and deterioration will have started.

In packing the cartons the heads 4 of lettuce are packed in the cartons in the field, as cut from the stalk, with the lettuce at substantially the atmospheric temperaure. The cartons are purposely so packed that the sides, ends and top and bottom of each carton will bulge outwardly. This has been found to be important since it prevents the openings 10, 12 from being closed when the cartons are stacked in the storage room or refrigerator cars in tiers. Perpendicularly extending secondary passageways 15, 16 are thus provided between the cartons in the stacks and tiers and the total effective cross sectional area of each of these passageways is preferably not less than substantially .28 square inch. Since this area is not obstructed to any degree by lettuce leaves such as might occur relative to openings 10, it may be smaller. The effective cross sectional area for either the primary openings 10 or 12 or 15, 16 should not be less than 0.28 square inch for most efficient operation. It may be greater, but by no means equal to the open areas in conventional crates, and still be quite effective. The slots 10 in the present instance and when used, are preferably vertically extending and substantially centrally disposed along the sides of each carton relative to the vertical dimension or height so that there is no weakening of the carton walls along the edges, and said slots preferably are equally spaced along the side walls 6. Thus central locations of the slots in the bulging walls enable each slot to communicate with the two secondary passageways adjacent thereto.

After the cartons are packed so that the walls bulge outwardly, as explained above, and after the closure flaps are stapled or otherwise secured together to retain the lettuce in tightly packed condition in each carton, said cartons are transported to the vacuum tubes or drums 1 and are placed on trucks and the loaded trucks are rolled into the tubes.

The door 17 of each tube 1 is then closed against ingress of atmospheric air.

The step of evacuation of air is preferably effected through a suction line 19 that opens into tube 1 and that communicates with a conventional steam jet evacuator 20 for evacuating the tube when door 17 is closed, until a relatively high vacuum of not less than 29.8 (approximately .0887 lb. per square inch absolute pressure) inches of mercury is provided. A conventional valve 21 in any suitable structure in pipe 19 is adapted to open and to close pipe 19 to the influence of the evacuator 20 and to open and to close the tube to atmospheric pressure as desired.

An evacuating system as indicated in U. S. Letters Patent to Beardsley and Brunsing No. 2,621,492 of December 16, 1952, would be suitable for evacuating tube 1, or any other suitable vacuum pump or means for creating the necessary vacuum would be suitable.

Valve 21 merely indicates a control that may be mechanically, electrically or manually actuated inasmuch as the present invention is not concerned with the specific mechanical structure of the valve.

By the present invention a plurality of conventional fluid pressure thermometers 24 are provided within the tube 1. Six are shown in the present instance, but this is not to be considered restrictive since more or less may be used provided, as hereinafter explained, a sufficient number are used to give an accurate indication of the average temperatures within the heads and the outside leaves. In any event, the distribution of thermometers in a load should be relatively wide.

In the drawing three of the thermometers are equally distributed throughout the load, one being in the end loads and one in the center load, and these three are positioned in contact with the outside leaves, as seen in Fig. 3. The other three, one in each end load and one in the center load, are each thrust into the heart of a head of lettuce. The thermometers may be thrust directly through the walls of the cartons and are capable of being so thrust. If the heads were exposed, the same arrangement of the thermometers, some being in contact with the leaves between heads and some being thrust directly into the heads, would be observed.

After gate 17 is closed, three of the gauges 26 will indicate the temperature of the leaves that are in contact with three of the thermometers and three will indicate the temperature of the centers or interiors of the heads that have three thermometers within said heads. If only two thermometers were used, then one would be in contact with the leaves and one would be thrust into the heart of another head. However, more than two should be used, for reasons already given.

Normally the temperature registered by all thermometers at the time the gate 17 is closed is substantially the atmospheric temperature, which may be approximately 65° F. to 85° F.

The valve 21 is opened after gate 17 is closed to effect withdrawal of the air and of the moisture of evaporation at a rate that will effect an evaporation of the free moisture on the leaves sufficiently fast to cause a rapid drop in the temperature within each carton as well as in the leaves bearing said moisture. A quick reduction of the pressure around and within the heads to about 29.8 inches, or approximately .0887 lb. per square inch, absolute pressure, according to how the vacuum is measured, will effect a drop in the temperature of the leaves having free moisture thereon from, say, 80° F. to about 32° F. within about 30 minutes. The time for such reduction will vary with the tightness of the heads and with moisture conditions within and on the heads.

The gauges 26 will usually indicate different temperatures. If the heads within the tube all have their maximum free moisture at or near their hearts and the outside leaves are relatively dry, then the gauges for the thermometers that are thrust into the heads and to the hearts will show a substantially lower temperature than the gauges that are connected with the thermometers that contact only the outside leaves, and the reverse will be true if the moisture conditions in the heads is reversed.

On the other hand, the load may have some heads that are relatively dry near their centers while other of the heads may be relatively dry on their outer leaves, and in such a case two or more thermometers may have about the same reduced temperature, one being at the heart of one head and the other being in the outer leaves. The practical result is the same for as soon as one of the gauges indicates that a temperature of substantially 32° F. has been reached, the attendant will either partially close valve 21 until the lowest temperature registered on any thermometer does not go below 32° F. but remains at substantially that temperature, until all gauges indicate substantially 32° F., or he will fully close the valve 21.

In a fairly representative example, if valve 21 is fully closed at the point when the first of the gauges indicates a temperature of 32° has been reached at one of said thermometers one or more of the other of the gauges will indicate a maximum temperature of, say, 40° F. It may be even higher. In any event, assuming the highest temperature is 40° F., as soon as valve 21 is closed or shortly thereafter the gauge or gauges that have indicated a temperature of about 32° F. will show a rise in temperature, while the thermometer or thermometers that indicated a temperature of 40° F. will show a drop, and ultimately all gauges will indicate substantially the same temperature, which may be approximately 36° F., and this represents the temperature throughout the heads of lettuce that are within the tube.

As soon as all gauges indicate that the temperature within the load and within the heads in the load have become equalized, at say 36° F., as an example, the valve 21 is again opened and remains open until one of the gauges indicates that the minimum desired temperature has been reached. By this time the highest reading may be 34° F. The valve 21 may again be closed, and will remain closed until the gauges indicate that the temperature within the load and within the heads is equalized, and they may read about 33° F. at that time. If desired, the step can then be repeated again, each time permitting equalization of the temperature within the heads until such temperature is substantially 32° F. or the desired temperature above freezing. The gate 17 may then be opened and the lettuce removed after air is admitted.

Irrespective of whether the rate of evaporation is controlled by maintaining a pressure of, say, .0887 lb. per square inch within tube 1 or by intermittently permitting a rise in this pressure and then lowering it again to .0887 as the pressures within the heads become equalized, the same phenomenon occurs. The low ambient pressure within the tube 1 enables the localized vapor pressures on the more humid or wet, damp surfaces and on the drier surfaces to quickly equalize, resulting in an equalization of temperature within the heads or load that could only occur by conduction over a prohibitively long period of time. In other words, when the leaves that are most humid or wet reach a temperature of 32° F. while the leaves having the drier surfaces are 40° F. a reduction in the rate of withdrawal of the vapor of evaporation so as to maintain an absolute ambient pressure of approximately .088 within the tube 1, or a mere cessation in the withdrawal of said vapor of evaporation, will result in a decrease in the vapor pressure at the wettest surfaces of the coldest leaves (due to reduction in the rate of evaporation) and an increase in the vapor pressure at the drier surfaces of the warmer leaves (due to a more rapid rate of evaporation) and the vapors of evaporation will then travel to the colder surfaces and condense thereon, thus resulting in a rise in the temperature of said coldest portions and a lowering in the temperature of the drier portions until the pressures (and temperatures) are equalized.

If the valve 21 were to remain open after the lowest temperature reading of the gauges 26 was 32° F., there might be a freezing of the leaves, which is impossible in the present case since the moisture in the leaves themselves contain natural vegetable salts that lowers their freezing point to below 32° F. The lettuce is cooled to 32° F. without damaging it.

By the present method, as soon as the temperature within the heads and within the load of lettuce within the tube 1 has become equalized at substantially 32° F., there is substantially no moisture of evaporation within the cartons to become absorbed thereby, as would be the case were the valve 21 closed when the first thermometer of the group indicated a temperature of 32° F. and the heads then removed after equalization at, say 35° F., but without further withdrawal of the vapors of evaporation.

In the present instance an absolute pressure of below .0887 could be used to rapidly bring the temperature of the most rapidly cooled leaves to 32° F., and then by maintaining the pressure at .0887 freezing can be avoided. For example, the pressure may be lowered to about 0.075 for quickly bringing fastest cooling lettuce to 32° F.; the pressure is then raised to 0.088 to avoid freezing.

When the temperature of the leaves within the heads and within the load is equalized at substantially 32° F., atmospheric air pressure will be established around the leaves by admitting air into the tube. The gate 17 is then opened and the cartons may be removed from the chamber and placed in a refrigerated space, whether in a warehouse or in proper transportation facilities wherein the desired temperature is maintained.

The gates 17, which are preferably at opposite ends of the tube, may be quickly opened by admitting fluid under pressure into a cylinder 30 within which is a piston 31 connected by rods 32 with the door or gate 17 for opening and closing the gate. Control valve 33 is adapted for opening and closing the fluid pressure lines 34, 35 to pressure or exhaust as required. The same control device may be used to simultaneously actuate the gates at opposite ends of the tube.

The supporting of the thermometers in sealed relation to the carton walls, as occurs when they are thrust through said walls, so that none of the vapors of evaporation will pass through the openings in which each thermometer is positioned, prevents a false reading.

It should again be emphasized that in a successful vacuum cooling system the means for evacuating the vacuum tubes must be sufficiently powerful to very quickly reduce the absolute pressure to .088 or the fastest cooling areas on the produce to approximately 32° F., and an object of the present invention is a method that will avoid freezing yet result in uniformly cooling the heads and load to approximately the freezing point. While other systems may involve steps that will avoid freezing the produce, they are too slow to be of much value.

We claim:

1. The method of cooling a load of fruit and vegetable products having unequal distribution of sufficient vaporizable moisture on accessible surfaces on and within the bodies of said products, said method comprising the steps of: placing said load within an enclosed space at atmospheric pressure; withdrawing air and vapors from within said space until a first pressure is reached which would cause the bodies of said products ultimately to fall below 32° F., the pressure in said space being reduced to said first pressure to cause said loads to cool very rapidly; maintaining said pressure within said space only until the coldest portion of said load first reaches 32° F. and warmer portions reach temperatures higher than 32° F.; raising the pressure in said space to a second value to prevent said coldest portion of said load from falling below 32° F.; maintaining said second pressure in said space until all portions of said load have the same temperature; and repeating each of said steps until all portions of said load are at 32° F.

2. The method of cooling a load of fruit and vegetable products having unequal distribution of sufficient vaporizable moisture on accessible surfaces on and within the bodies of said products, said method comprising the steps of: placing said load within an enclosed space at atmospheric pressure; withdrawing air and vapors from within said space until a first pressure is reached which would cause the bodies of said products ultimately to fall below 32° F., the pressure in said space being reduced to said first pressure to cause said loads to cool very rapidly; maintaining said pressure within said space only until the coldest portion of said load first reaches 32° F. and warmer portions reach temperatures higher than 32° F.; raising the pressure in said space to a value to prevent said coldest portion of said load from falling below 32° F.; and maintaining said second pressure in said space until all portions of said load have the same temperature.

3. The method of cooling a load of fruit and vegetable products having unequal distribution of sufficient vaporizable moisture on accessible surfaces on and within the bodies of said products, said method comprising the steps of: placing said load within an enclosed space at atmospheric pressure; withdrawing air and vapors from within said space until a first pressure below .088 lb. per sq. inch is reached, said first pressure tending to cause at least some portions of the bodies of said products ultimately to fall below 32° F.; maintaining said first pressure within said space only until the coldest portion of said load first reaches 32° F. and warmer portions reach temperatures higher than 32° F.; raising the pressure in said space to .088 lb. per sq. inch to prevent said coldest portion of said load from falling below 32° F.; and maintaining the pressure in said space at .088 lb. per sq. inch until all portions of said load have the same temperature; and repeating each of said steps until all portions of said load are at 32° F.

References Cited in the file of this patent

UNITED STATES PATENTS

| | | |
|---|---|---|
| 2,344,151 | Kasser | Sept. 9, 1940 |
| 2,351,417 | Ferguson | June 13, 1944 |
| 2,621,492 | Beardsley et al. | Dec. 16, 1952 |
| 2,634,590 | Beardsley | Apr. 14, 1953 |
| 2,684,907 | Brunsing | July 27, 1954 |
| 2,699,048 | Brunsing | Jan. 11, 1955 |